Figure 1:
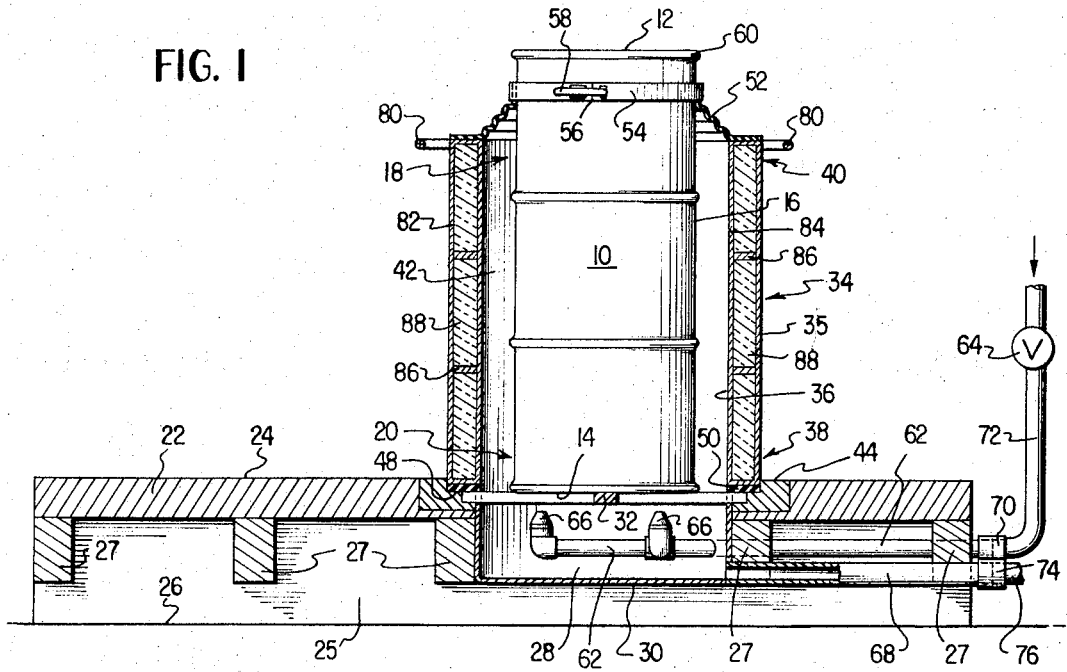

Jan. 9, 1968  J. D. COLUMBO  3,362,466
APPARATUS FOR CONDITIONING THE
CONTENTS OF A CONTAINER
Filed April 7, 1966

INVENTOR
JOSEPH D. COLUMBO
BY Shanley & O'neil
ATTORNEY

United States Patent Office 3,362,466
Patented Jan. 9, 1968

3,362,466
APPARATUS FOR CONDITIONING THE
CONTENTS OF A CONTAINER
Joseph D. Columbo, 96 Boiling Springs Ave.,
East Rutherford, N.J. 07073
Filed Apr. 7, 1966, Ser. No. 540,880
9 Claims. (Cl. 165—80)

This invention relates to heat exchange apparatus and more particularly, to apparatus for treating the contents of a container with a fluid heat exchange medium.

A main object of the invention is the provision of improved apparatus for heating or cooling the contents of containers.

A further object of the invention is the provision of improved apparatus for heating or cooling the contents of the relatively large containers generally known as drums.

Another object of the invention is the provision of improved apparatus for heating liquid contained in drums.

Still another object of the invention is the provision of improved apparatus for conditioning material contained in drums, which apparatus will be economical to manufacture and easy to install and use.

Other objects of the invention will appear more fully from the following detailed description which, when considered in connection with the accompanying drawings, discloses a preferred embodiment of the invention for purposes of illustration only and not for definition of the limits of the invention. For determining the scope of the invention, reference can be made to the appended claims.

Figure 2:
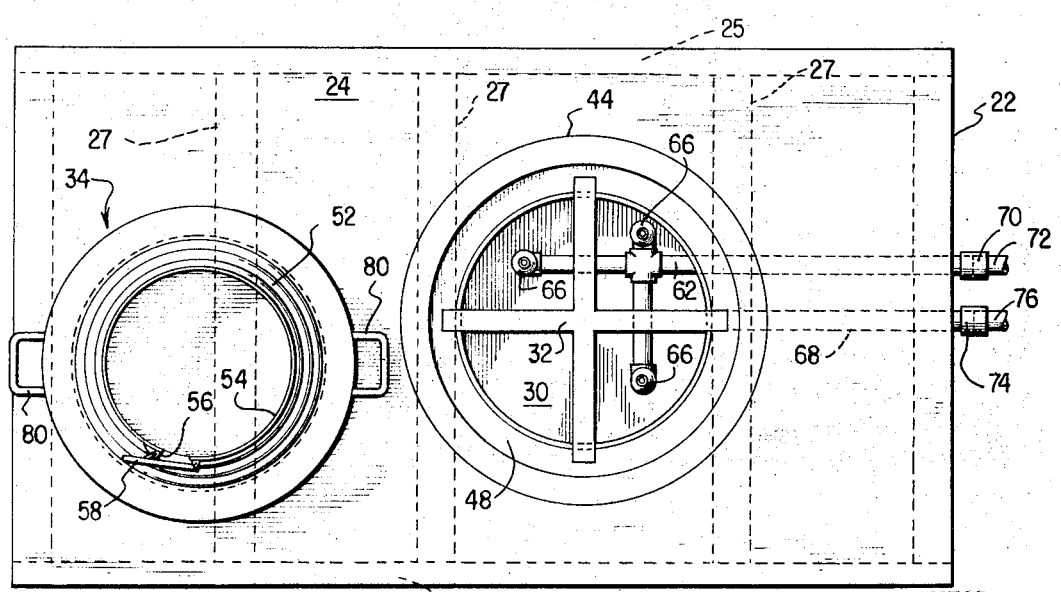

In the drawings, wherein similar reference characters denote similar elements throughout the several views:

FIGURE 1 is a view in vertical cross section of apparatus that forms a preferred embodiment of the invention, shown fully assembled in position to condition the contents of a drum; and FIGURE 2 is a plan view of the apparatus of FIGURE 1, shown with the cover means moved to one side and the drum removed.

Referring to the drawings in greater detail and with particlar reference to FIGURE 1, apparatus that forms a preferred embodiment of the invention is arranged to condition the contents of a container which takes the form of a drum 10. Drum 10 will be designated as having a top surface 12, a bottom surface 14, and an outer periphery 16. Drum 10 will further be indicated to have an upper portion generally indicated at 18, and a lower portion generally indicated at 20. According to the invention, a base 22 having an upper surface 24 is provided. In the embodiment of FIGURE 1, base 22 rests on working floor 26 and is highly mobile in that it takes the form of a pallet or skid that can be easily transported. Base 22 includes side-bracing members 25 and cross-bracing members 27, which are of lesser height than the side bracing members 25 so as to permit the insertion of the prongs of a forklift between members 25.

Means defining a chamber 28 in base 22 are provided, according to the invention. In FIGURE 1, these means take the form of a pan-like member 30. As shown, chamber 28 has an open top and extends downwardly from upper surface 24 of base 22. Pan-like member 30 is preferably nested between members 27.

According to the invention, means spanning the open top of chamber 28 are provided, for supporting drum 10, at the lower portion 20 thereof, above chamber 28. In the embodiment illustrated, the drum support means takes the form of a grating 32, best seen in FIGURE 2. As shown, grating 32 is in the form of an X-shaped element having two cross members, although it is apparent that gratings of other configurations could be utilized.

Elongated cover means, generally indicated at 34, are provided, having closed sides 35, open ends, an inner periphery 36, a lower portion generally indicated at 38, and an upper portion generally indicated at 40. When the apparatus is assembled to condition the contents of a drum, the inner periphery 36 of the cover means 34 is spaced laterally from the outer periphery 16 of the drum 10, forming a compartment 42 which circumscribes the drum 10, through which fluid heat exchange medium may circulate to condition the contents of the container. Cover means 34, which is preferably of cylindrical configuration, is disposable over drum 10 and is detachably supported at its lower portion 38 by cover supporting means 44, which are associated with base 22. In the drawing, cover supporting means 44 take the form of an annular member which circumscribes the periphery of the open top of chamber 28 and is recessed in base 22. Drum support grating 32 is preferably received in annular member 44, as shown. The lower end of cover means 34 is received in annular recess 48 in annular member 44. Recess 48 serves to align cover means 34 with chamber 28.

According to the invention, means for establishing a releasable, substantially fluidtight seal between cover means 34 and cover supporting means 44 are provided. In the embodiment shown in the drawings, these means take the form of an annular gasket 50 of rubber, neoprene, or the like, secured to the lower end of cover means 34.

According to the invention, the sides 35 of the cover means extend above the upper surface 24 of base 22 a distance less than the height of drum 10. Sealing collar means indicated at 52, associated with the upper portion 40 of cover means 34, are provided. In FIGURE 1, these means take the form of an annular segment of a resilient material such as rubber which is secured to the upper end of cover means 34 and extends laterally inwardly thereof to circumscribe the outer periphery 16 of drum 10. Means are associated with the resilient sealing collar means 52, for forming a releasable, substantially fluidtight seal between resilient sealing collar means 52 and the outer periphery 16 of drum 10. In the preferred embodiment illustrated, clamping means are utilized, and include an annular band 54, which may be of metal or other suitable material, which is secured to sealing collar means 52 and which is split at one point 56 around its periphery. The clamping means also includes latching means 58, which may be of any conventional design suitable for the purpose, secured to annular band 54 as is best seen in FIGURE 2. Latching means 58 are shown in the open position in FIGURE 2 and in the closed position in FIGURE 1. The clamping means are operative when latching means 58 are closed to tightly secure resilient sealing collar means 52 against the outer periphery 16 of drum 10, at the upper portion 18 thereof as shown. Latching means 58 are operative to permit band 54 to open a sufficient distance to permit band 54 to slip over lip 60 which is conventionally provided on drums such as 10. Sealing collar means 52 possess sufficient elasticity to stretch to permit the passage of band 54 over lip 60.

According to the invention, piping means are provided for passing fluid heat exchange medium into direct heat exchange relationship with drum 10 in compartment 42. In the preferred embodiment, these piping means are indicated at 62, and are disposed below drum support grating 32 for passing fluid heat exchange medium beneath drum 10. Valve 64 controls the flow of heat exchange medium through piping means 62. As can be seen from the drawings, piping means 62 preferably include a plurality of branches which pass heat exchange medium to a number of locations beneath drum 10. Orifice means 66 in piping means 62 discharge fluid heat exchange medium upwardly and into direct heat exchange relationship with drum 10 in compartment 42. Thus, the apertures in the drum support grating provide flow passage means for passing fluid heat exchange medium between chamber 28 and compartment 42. In the illustrated embodiment of the invention, orifices 66 take the form of steam injection nozzles which discharge steam against bottom surface 14 of drum 10 and upwardly around the outer periphery 16 of the drum. Spent heat exchange medium, which in the case of steam, would be water, drains through the apertures in drum support grating 32, collects in panlike member 30, and is withdrawn from chamber 28 by conduit means 68. Detachable connector means 70 are provided for connecting piping 62 to a source of fluid heat exchange medium (not shown) by way of conduit 72 and valve 64. Detachable connector means 74 are provided for connecting conduit means 68 to drain conduit 76. These detachable connector means are provided so that the apparatus can be quickly installed and quickly disconnected for movement to another location. Flexible piping may be utilized for conduits 72 and 76, to further facilitate installation by permitting some latitude in the exact location of base 22. This avoids necessity for a precise positioning of the base.

Since cover means 34 is to be lifted into position over drum 10, handles 80 are preferably provided to facilitate handling of the cover means, which is preferably of lightweight construction to further facilitate manipulation. Thus, in FIGURE 1, cover means 34 comprises a thin outer wall 82, a concentrically disposed, thin inner wall 84, and annular ribs 86 spaced longitudinally along the cover means between walls 82 and 84. Lightweight, fibrous insulating material 88, such as glass fiber or the like, is packed between ribs 86. The walls and ribs are preferably of aluminum, aluminum alloy or light gauge steel.

The manner of use of the apparatus of FIGURE 1 will be explained with reference to an operation in which liquid contained in a drum is to be heated by steam. The base 22 is brought from its storage area or other drum heating area by means of a forklift or otherwise, and placed in position on working floor 26. Connections are made to the steam line 72 and drain conduit 76. Drum 10, containing liquid to be heated, is placed in position on drum support grating 32. Cover means 34 are then placed over the drum onto the cover supporting means 44, and properly aligned in recess 48. The resilient sealing collar means 52 are clampingly secured against the outer periphery 16 of the drum 10. Steam is then passed through piping means 62 and orifice means 66 by opening valve 64. Steam is discharged through the apertures in grating 32 against the bottom surface 14 of drum 10 and upwardly into compartment 42, in direct heat exchange relationship with the outer periphery 16 of the drum 10. Condensed water passes downwardly through the apertures in the drum support grating 32, to collect in member 30 and be withdrawn by conduit 68. The material contained in the drum will thus be heated by conduction through the walls of the drum, and convection as heated liquid in the drum rises to the top and colder liquid settles to the bottom. When the liquid in the drum has been heated to the extent desired, the flow of steam is terminated by closing valve 64. Latching means 58 are released, and the cover means 34 are slipped off the drum and placed to one side. The drum is then moved off drum support grating 32, and another drum placed in position to be treated.

Although apparatus according to the invention is particularly useful in heating liquid contents of drums with steam as a fluid heat exchange medium, it is contemplated that the apparatus has utility in other operations in which material in a drum is to be conditioned by heat exchange fluid. Thus, a liquid heat exchange medium such as hot water or other suitable heated liquid could be utilized. Similarly, a relatively cold liquid such as cold water or brine could be utilized to effect cooling of material contained in a drum. It should be apparent that contents of the drum need not necessarily be liquid, and that the drums themselves need not necessarily be of cylindrical configuration.

It will also be apparent that the invention has many advantages. The provision of the drum conditioning apparatus on a mobile base permits a single apparatus to be used at a plurality of locations throughout a plant, avoiding the necessity of installation of treating apparatus at a plurality of locations, and the necessity for transporting drums long distances. In the preferred embodiment, therefore, the base takes the form of a mobile pallet or skid, but it is contemplated that the base could be permanently installed at a drum conditioning site.

Irrespective of whether the base is mobile or permanently installed the invention minimizes requirements for vertical lifting of the drums. This is a significant advantage, because drums which contain material to be treated are generally quite heavy, conventionally containing up to 55 gallons or more of liquid. The vertical lifting of such drums into conventional heating or cooling tanks is time consuming and laborious, although such tanks are necessary to obtain the advantages of direct heat exchange. The apparatus according to the invention minimizes necessity for vertical lifting of heavy drums by the arrangement in which a lightweight cover means is slipped over the drum after the drum has been placed on a drum support grating. The drum may be placed on the drum support grating by rolling on edge up a ramp on to the base, when the base is in the form of a pallet or skid, or directly across the floor in a situation where the base is permanently mounted.

Apparatus according to the invention is relatively easy to operate and economical to fabricate. The apparatus can be quickly installed and requires little maintenance. Because the cover is insulated and the heat exchange medium is in direct heat exchange relationship with the drum, rapid conditioning of the contents of the drum is facilitated, while heat loss or gain from the environment is reduced.

What is claimed is:

1. Apparatus for treating the contents of a container with a fluid heat exchange medium, comprising
 a base having an upper surface,
 means defining a chamber in the base,
 the chamber having an open top, and extending downwardly from the upper surface of the base,
 container support means spanning the open top of the chamber, for supporting a container above the chamber,
 elongated cover means disposable over the container and having closed sides, open ends, an inner periphery, a lower portion and an upper portion,
 the inner periphery of the cover means being spaced laterally from the outer periphery of the container, forming a compartment circumscribing the container,
 cover supporting means associated with the base, for detachably supporting the cover means, at the lower portion thereof, about the open top of said chamber,
 means for establishing a releasable, substantially fluidtight seal between the cover means and the cover supporting means,
 the sides of the cover means extending above the upper surface of the base a distance less than the height of the container,
 resilient sealing collar means associated with the upper portion of the cover means and extending laterally to circumscribe the outer periphery of the container,
 means associated with the resilient sealing collar means, for forming a releasable, substantially fluidtight seal between the resilient sealing collar means and the outer periphery of the container, piping means for passing fluid heat exchange medium into direct heat exchange relationship with the container in the compartment, flow passage means for passing fluid heat exchange medium between the chamber and the compartment, and conduit means for withdrawing spent heat exchange medium from said chamber.

2. Apparatus as defined in claim 1, wherein the base is mobile, and further comprising first detachable connector means, for connecting the piping means to a source of fluid heat exchange medium, and detachable connector means, for connecting the conduit means to a drain.

3. Apparatus as defined in claim 2, wherein the support means spanning the open top of the chamber comprise a grating, and apertures in the grating form said flow passage means for passing fluid heat exchange medium between the chamber and the compartment.

4. Apparatus as defined in claim 3 wherein clamping means form said releasable, substantially fluid-tight seal between the resilient sealing collar means and the outer periphery of the container.

5. Apparatus as defined in claim 4, wherein the piping means includes means disposed below said grating, for passing fluid heat exchange medium into said chamber beneath said container, and orifice means for discharging fluid heat exchange medium upwardly through the flow passage means and into direct heat exchange relationship with said container in the compartment.

6. Apparatus as defined in claim 5, wherein the orifice means comprise a plurality of steam injection nozzles.

7. Apparatus as defined in claim 6, wherein the cover means is of cylindrical configuration and the container is a drum.

8. Apparatus as defined in claim 7, wherein the cover supporting means comprise an annular member circumscribing the periphery of the open top of said chamber, and said annular member includes means for receiving the lower end of said cover means and for aligning the cover means with said chamber.

9. Apparatus for treating the contents of a container with a fluid heat exchange medium, comprising a base having an upper surface, means defining a chamber in the base, the chamber having an open top, and extending downwardly from the upper surface of the base, container support means spanning the open top of the chamber, for supporting a container above the chamber, elongated cover means disposable over the container and having closed sides, upper and lower open ends, an inner periphery, a lower portion and an upper portion, the inner periphery of the cover means being spaced laterally from the outer periphery of the container, forming a compartment circumscribing the container, cover supporting means associated with the base, for detachably supporting the cover means, at the lower portion thereof, about the open top of said chamber, means for establishing a releasable, substantially fluid-tight seal between the cover means and the cover supporting means, means for closing the upper open end of the cover means and sealing the compartment, piping means for passing fluid heat exchange medium into direct heat exchange relationship with the container in the compartment, flow passage means for passing fluid heat exchange medium between the chamber and the compartment, and conduit means for withdrawing spent heat exchange medium from said chamber.

References Cited
UNITED STATES PATENTS

| | | | |
|---|---|---|---|
| 1,571,948 | 2/1926 | Houskeeper | 165—80 X |
| 2,231,329 | 2/1941 | Goll | 165—80 X |
| 2,288,137 | 6/1942 | Jones | 165—80 X |

FOREIGN PATENTS

| | | |
|---|---|---|
| 638,561 | 11/1936 | Germany. |
| 160,012 | 3/1921 | Great Britain. |

ROBERT A. O'LEARY, Primary Examiner.

M. A. ANTONAKAS, Assistant Examiner.